(12) United States Patent
Horn et al.

(10) Patent No.: US 7,775,169 B2
(45) Date of Patent: *Aug. 17, 2010

(54) ACCESS ASSEMBLY BETWEEN ADJACENT PRODUCT STORAGE TANKS ON A PLANTING IMPLEMENT

(75) Inventors: Rodney S. Horn, Woodridge, IL (US); Sajid Nanlawala, Chicago, IL (US)

(73) Assignee: CNH America LLC, New Holland, PA (US)

( * ) Notice: Subject to any disclaimer, the term of this patent is extended or adjusted under 35 U.S.C. 154(b) by 1141 days.

This patent is subject to a terminal disclaimer.

(21) Appl. No.: 11/381,463

(22) Filed: May 3, 2006

(65) Prior Publication Data

US 2007/0256894 A1    Nov. 8, 2007

(51) Int. Cl.
*A01C 15/00* (2006.01)
*E04C 1/00* (2006.01)
*E04C 5/00* (2006.01)
*E06C 5/00* (2006.01)
*E04G 3/00* (2006.01)

(52) U.S. Cl. .............. 111/200; 182/64.1; 182/84; 182/86; 182/127

(58) Field of Classification Search ............ 111/52, 111/200; 182/64.1, 83–86, 127; 280/163–166, 280/169; 296/62
See application file for complete search history.

(56) References Cited

U.S. PATENT DOCUMENTS

| 2,855,875 | A |   | 10/1958 | Oehler at al. |
|---|---|---|---|---|
| 3,543,704 | A |   | 12/1970 | Hansen at al. |
| 4,312,621 | A |   | 1/1982 | Quanbeck et al. |
| 4,379,664 | A |   | 4/1983 | Klein et al. |
| 4,478,159 | A |   | 10/1984 | Melgoza |
| 4,726,303 | A |   | 2/1988 | Degelman et al. |
| 5,205,603 | A | * | 4/1993 | Burdette, Jr. .......... 296/62 |
| 5,529,455 | A |   | 6/1996 | Kaster et al. |
| 5,601,209 | A |   | 2/1997 | Barsi et al. |
| 5,685,245 | A |   | 11/1997 | Bassett |
| 5,947,040 | A |   | 9/1999 | Gregor |
| 6,068,277 | A |   | 5/2000 | Magnussen |
| 6,209,682 | B1 |  | 4/2001 | Duffy et al. |
| 6,308,645 | B1 |  | 10/2001 | Newkirk et al. |
| 6,502,645 | B1 |  | 1/2003 | Brueggen et al. |
| 6,581,530 | B1 |  | 6/2003 | Hall et al. |

(Continued)

FOREIGN PATENT DOCUMENTS

FR            2431947 A       3/1980

*Primary Examiner*—Christopher J. Novosad
(74) *Attorney, Agent, or Firm*—Rebecca Henkel

(57) ABSTRACT

An access assembly leading to first and second storage tanks of a planting implement is provided. The access assembly includes a central ramp located between and fixed in relation to the first and second storage tanks, and an extended ramp having a forward end opposite a rearward end aligned in a fore-and-aft direction relative to the direction of travel of the implement. The forward end of the ramp is pivotally connected about a first horizontal axis at a rearward end of the central ramp. The access assembly further includes a ladder pivotally independently coupled about a second horizontal axis at the rearward end of the extended ramp. The ladder and the extended ramp pivot together about the first horizontal axis at the forward end of the extended ramp between a lowered, operative position and a raised, inoperative position above the central ramp.

7 Claims, 7 Drawing Sheets

U.S. PATENT DOCUMENTS

| | | |
|---|---|---|
| 6,584,919 B2 | 7/2003 | McQuinn |
| 6,935,254 B2 | 8/2005 | Ostrander et al. |
| 2002/0189899 A1 | 12/2002 | Hedley et al. |
| 2003/0110999 A1 | 6/2003 | Meyer et al. |

* cited by examiner

ACCESS ASSEMBLY BETWEEN ADJACENT PRODUCT STORAGE TANKS ON A PLANTING IMPLEMENT

CROSS-REFERENCE TO RELATED APPLICATIONS

This application is related to U.S. patent application Ser. No. 11/381,459 entitled "Access Assembly To Adjacent Product Storage Tanks on a Planting Implement" filed on the same date as this application and in the name of the same inventors.

BACKGROUND OF THE INVENTION

1. Field of the Invention

The invention relates to an agricultural planting implement, and more specifically, relates to an access assembly adjustable in a vertical direction to facilitate access between a pair of storage tanks mounted on the implement.

2. Discussion of Related Art

Various agricultural planting implements have been employed to deliver product (e.g., seed, fertilizer, herbicides, etc.) to agricultural fields. As the size of agricultural planting implements continues to grow, the versatility of such planting implements becomes more significant.

Planting implements can be of various designs to dispense seeds, fertilizer, and herbicides at a controlled rate to an agricultural field. In a conventional arrangement, a tractor is coupled to tow the planting implement across the agricultural field. The planting implement generally includes a tool bar to which are attached a plurality of planting units in a generally parallel, spaced relation apart. Each planting unit typically includes a product hopper or bulk storage tank configured for containing and carrying a large quantity of product to be distributed or a smaller container fed from a centralized or large hopper, a device for opening a furrow in the ground as the tractor drawn tool bar is advanced across the field over the ground, a metering mechanism coupled to the product hopper for dispensing individual granuals of product into the furrow at a controlled rate, and a further device for moving soil at the sides of the furrow to close the furrow over the product. The many different types of seeds to be planted using a planting implement can include e.g., corn, cotton, sorghum, sugar beets, soybeans and sunflowers that may vary considerably in size, weight and shape.

A wide variety of agricultural planting implements are generally available, depending on the type and the form of the product being metered and on the desired accuracy and consistency of metering. A certain conventional planting implement can be of the mechanical-type or of the air pressure differential-type.

The mechanical type of planting implement generally includes a vertical or horizontal seed plate or disc with mechanically actuated fingers of similarly operated mechanical devices for separating individual seeds from the seed disc and then dispensing them into the furrow. The air pressure differential type planting unit, which is also commonly known as an air seeder, is of generally of two types: a negative pressure type and a positive-pressure type.

The vacuum-type planting implement generally includes a pressure source coupled to a chamber opposite a seed mass or supply, with a metering mechanism therebetween. The pressure source communicates a vacuum through openings in the metering mechanism to the seed mass. The vacuum is of sufficient magnitude so as to draw seeds into the openings defined by the metering mechanism and hold the seeds thereto as the seeds are moved through the chamber under the influence of the moving metering mechanism toward a seed discharge area for application in an agricultural field. The positive-pressure type planting implement generally includes a pressure source that creates a forced air stream configured to convey seed for distribution in the field.

A certain known positive-pressure type planting implement includes a product metering compartment that is fed product by gravity from a bulk fill storage tank or hopper. The product is metered by a meter roller assembly of flutes to a pneumatic distribution system (e.g., conveyance lines). A pressure source (e.g., blower) is configured to create a forced air stream that entrains the product for conveyance through distribution lines to a series of secondary distribution manifolds ("headers"). The manifolds include conveyance lines configured to distribute the forced air stream entrained product to a group of ground openers for placement of the product in the ground.

Another example of a positive-pressure type planting implement creates a forced air stream that entrains seed or other product delivered from bulk storage tanks for conveyance to relatively smaller seed bins, mini-hoppers, or reservoirs located at receivers remotely located from the bulk storage tanks. The bulk storage tanks allow a farmer to plant more acreage before having to stop to fill the bulk storage tanks again, resulting in quicker planting and less labor while maintaining the precision spacing available by on-row singulation. A hydraulic-driven blower typically provides the forced air stream along a path to agitate and entrain the product from the bulk storage tanks. A pneumatic distribution system generally includes one or more distribution lines operable to route or direct the combined stream of forced air and entrained product toward the one or more remote receivers. Each receiver generally includes one or more product bins or mini-hoppers located on top of a respective metering unit and an injector configured to uniformly apply the product into a furrow in the ground.

These certain known positive-pressure type agricultural applicators as described above have drawbacks. Farmers typically must access between the bulk storage tanks or hoppers to monitor product levels, to clean the tanks after planting or when switching between different products, or to add one or more bags of product carried from a raised bed of a truck. Also, operators typically find it cumbersome or are unable to fill the bulk tanks with product using an auger from an elevated truck bed.

Therefore, there is a need or desire for an access assembly for a planting implement that provides ready entry to the hatch cover of each of the storage tanks. The access assembly should also be simple and reliable to operate and economical to manufacture. In addition, the access assembly should be configured to be utilized with a wide variety of agricultural implements in addition to those related to planting.

SUMMARY OF THE INVENTION

The present invention provides an access assembly for entry between a pair of bulk storage tanks mounted on a wheeled frame assembly of a planting implement. The access assembly of the invention is adjustable so as to provide a ready approach to the storage tanks from the ground, as well as from a raised bed of a truck pulled alongside the planting implement. When ready for operation, the access assembly of the invention is configured to be slid and pivoted to a raised position that does not interfere with operation of the planting implement in the field.

In a first embodiment of the present invention, an access assembly for a agricultural implement having a wheel frame assembly in support of a first storage tank and a second storage tank is provided. The access assembly includes a central ramp located between and fixed in relation to the first and second storage tanks, and an extended ramp. The extended ramp generally includes a forward end located opposite a rearward end and is aligned in a fore-and-aft direction relative to the direction of travel of the implement. The forward end of the ramp is pivotally connected about a first horizontal axis at a rearward end of the central ramp. The access assembly further includes a ladder pivotally coupled about a second horizontal axis at the rearward end of the extended ramp. The ladder and the extended ramp pivot together about the first horizontal axis at the forward end of the extended ramp between a raised position and a lowered position.

A preferred embodiment of the ladder is further configured to slide in a linear direction in parallel relation to the extended ramp. In so doing, the ladder slides between an extended position and a stowed position for operation or transport. The ladder in the extended position is pivotal about the rearward end of the extended ramp. The ladder in the stowed position is aligned generally in parallel and underneath in the vertical direction relative to the extended ramp, and is restrained from pivoting independent of the extended ramp. A lock pin is configured to restrain the ladder in the stowed position relative to the extended ramp. The extended ramp includes a tread surface extending a length of the extended ramp, and a slide mechanism is located underneath the tread surface in sliding support of the ladder in the linear direction.

The preferred access assembly further includes handrails and kickboards located on opposite sides of the extend ramp. The access assembly further includes a ramp support footing assembly located at the rearward end of the extended ramp. The ramp support footing assembly is aligned to support the rearward end of the extended ramp in a vertical direction from the wheeled frame assembly.

In another embodiment, the present invention provides an agricultural planting implement that includes a wheeled frame assembly in support of a first storage tank and a second storage tank, and an access assembly to the first and second storage tanks. The access assembly includes a central ramp located between the first and second storage tanks, an extended ramp having a forward end pivotal coupled about a horizontal axis at a rearward end of the central ramp, and a ladder coupled at a rearward end of the extended ramp opposite the central ramp, wherein the ladder and the extended ramp pivot together about the horizontal axis between a raised and a lowered position.

In accordance with yet another aspect of the invention, a method of accessing between first and second storage tanks mounted on a wheeled frame assembly of an agricultural planting implement is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
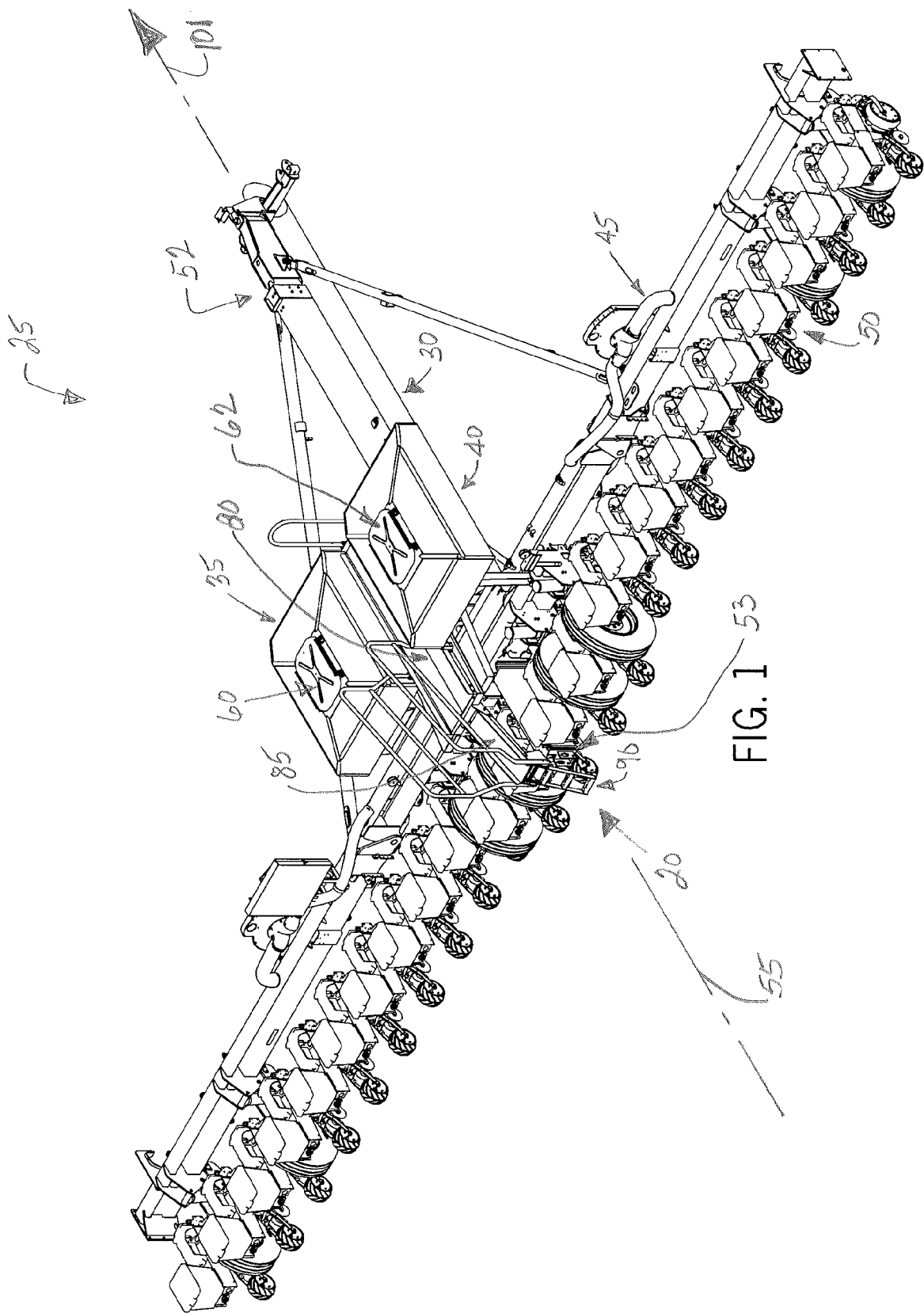
FIG. 1 illustrates an isometric view of an access assembly of the present invention mounted to provide entry between a pair of bulk storage tanks of a planting implement.

FIG. 1 illustrates an access assembly 20 in accordance with the present invention mounted on a planting implement 25. The exemplary planting implement 25 is a positive pressure-type planting implement that includes a wheeled frame assembly 30 in support of first and second bulk storage tanks or hoppers 35 and 40, respectively, and pneumatic lines (not shown) configured to convey air entrained product in a conventional manner from the bulk storage tanks 35 and 40 to a series of remote receivers 50 for distribution of the product in the agricultural field.

The exemplary wheeled frame assembly 30 includes a forward hitch 52 opposite a rearward hitch 53, both generally aligned along a central longitudinal axis 55 of the planting implement 25. The first bulk storage tank 35 is located on one side of the central longitudinal axis 55, and the second bulk storage tank 40 is located on another side of the central longitudinal axis 55 opposite the first bulk storage tank 35. Each first and second bulk storage tank 35 and 40 includes a hatch cover 60 and 62, respectively. The hatch covers 60 and 62 are generally configured to allow an operator to access the interior of the first and second bulk tanks 35 and 40, respectively.

The receivers 50 are generally configured to perform on-row planting of the product to the agricultural field. Each receiver 50 generally includes one or more bins or mini hoppers configured to receive product from the bulk storage tanks 35 and 40 via the pneumatic lines (not shown) in a conventional manner. Each receiver 50 further includes a respective product metering unit and injector generally configured to uniformly apply the product from the mini hoppers to a furrow in the ground in a conventional manner.

Still referring to FIG. 1, the access assembly 20 is configured to provide access to the hatch covers 60 and 62 of the bulk storage tanks 35 and 40, respectively. The exemplary access assembly 20 generally includes a central ramp 80, an extended ramp 85 located rearward from the central ramp 80, and a ladder assembly 90. The central ramp 80 is located and extends between the first and second storage tanks 60 and 62 generally inline with the central longitudinal axis 55 of the planting implement 25. Thereby, an operator standing on the central ramp 80 can access the hatch covers 60 and 62 of both the first or second bulk storage tanks 35 and 40, respectively.

Figure 2:
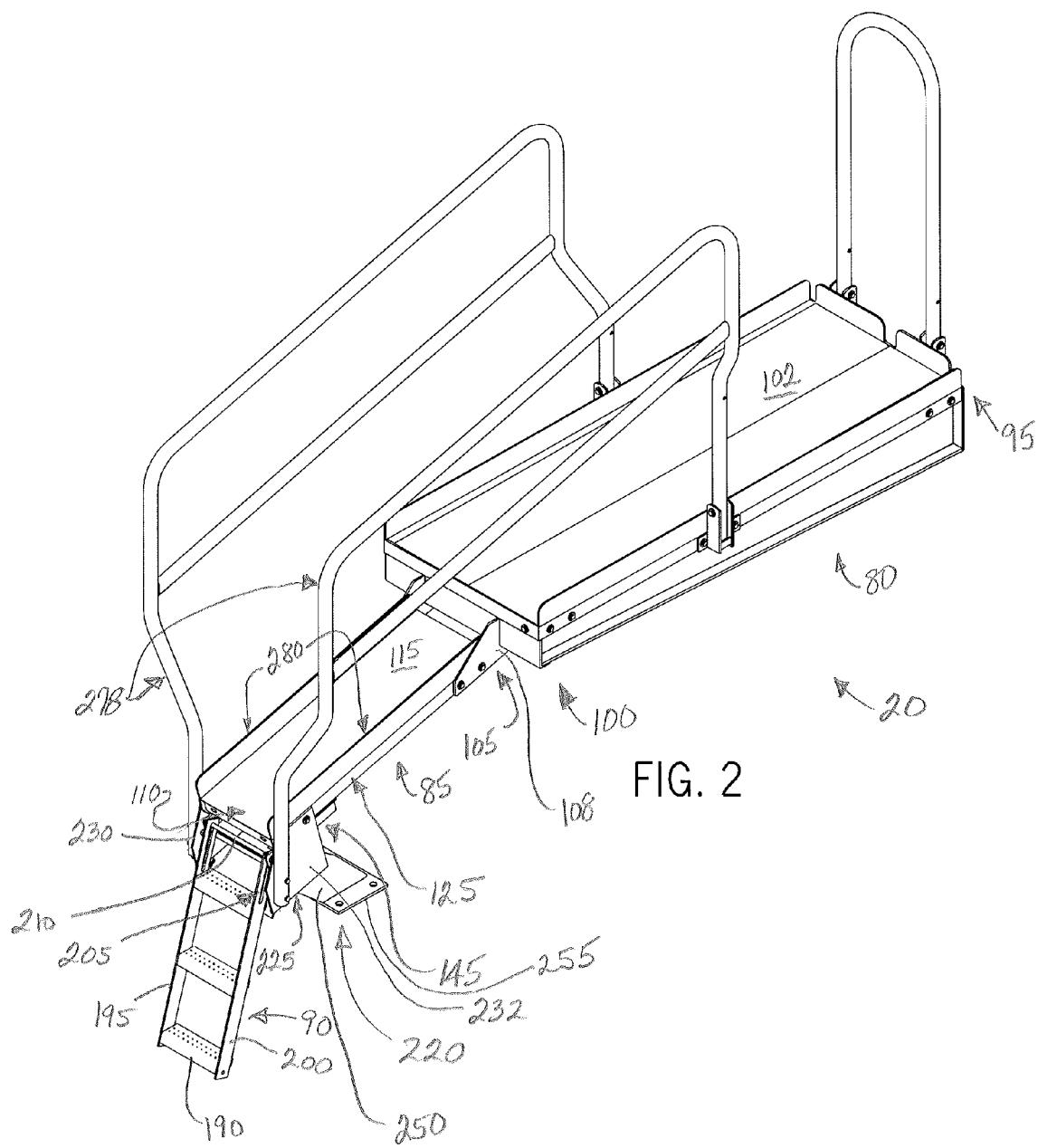
FIG. 2 illustrates a detailed isometric view of the access assembly shown in FIG. 1, the access assembly including a pivotal ladder assembly in a lowered, extended position.
Figure 3:
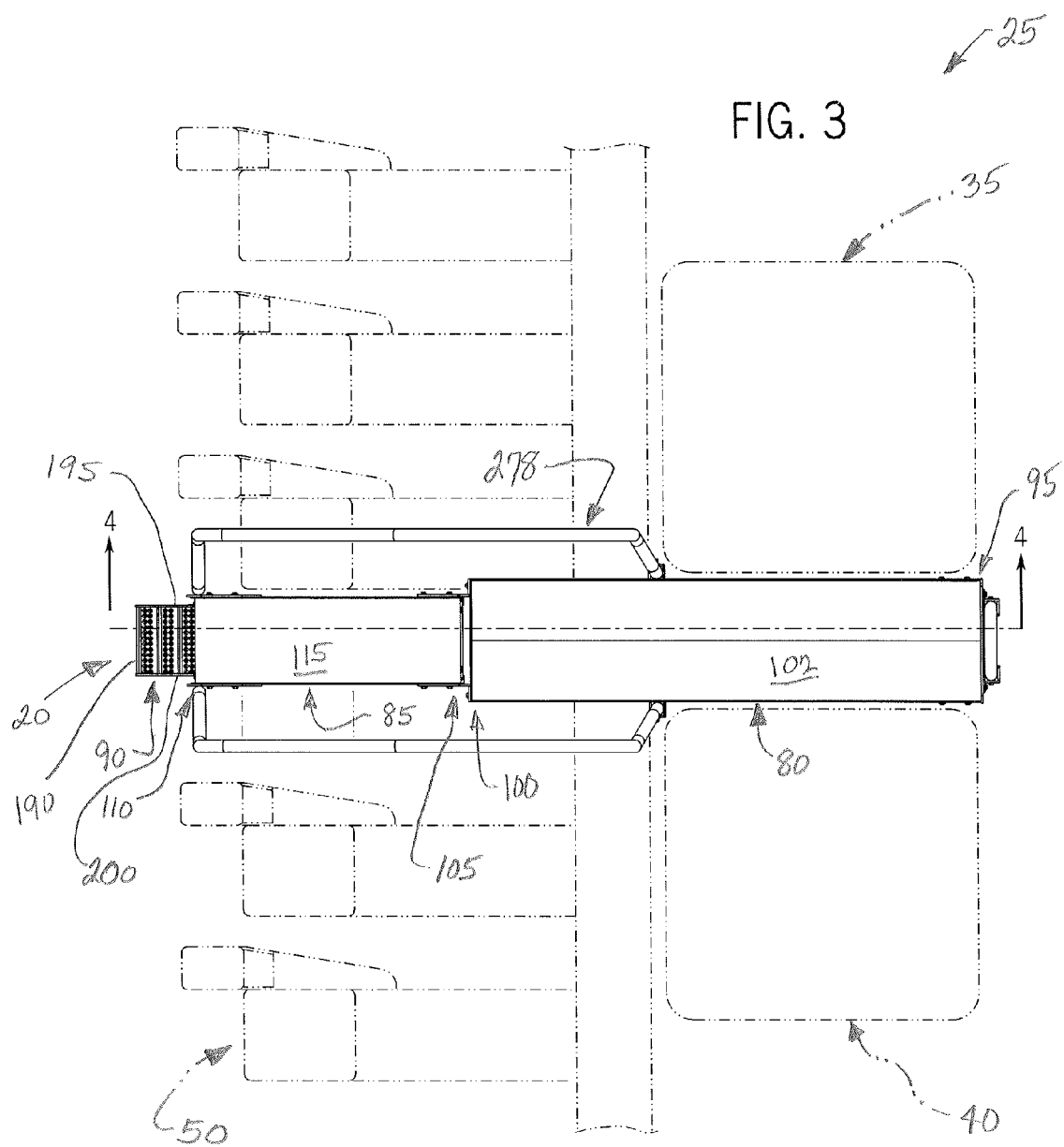
FIG. 3 illustrates a top plan schematic view of the access assembly mounted on the planting implement, the pivotal ladder assembly positioned in the lowered, extended position.
Figure 4:
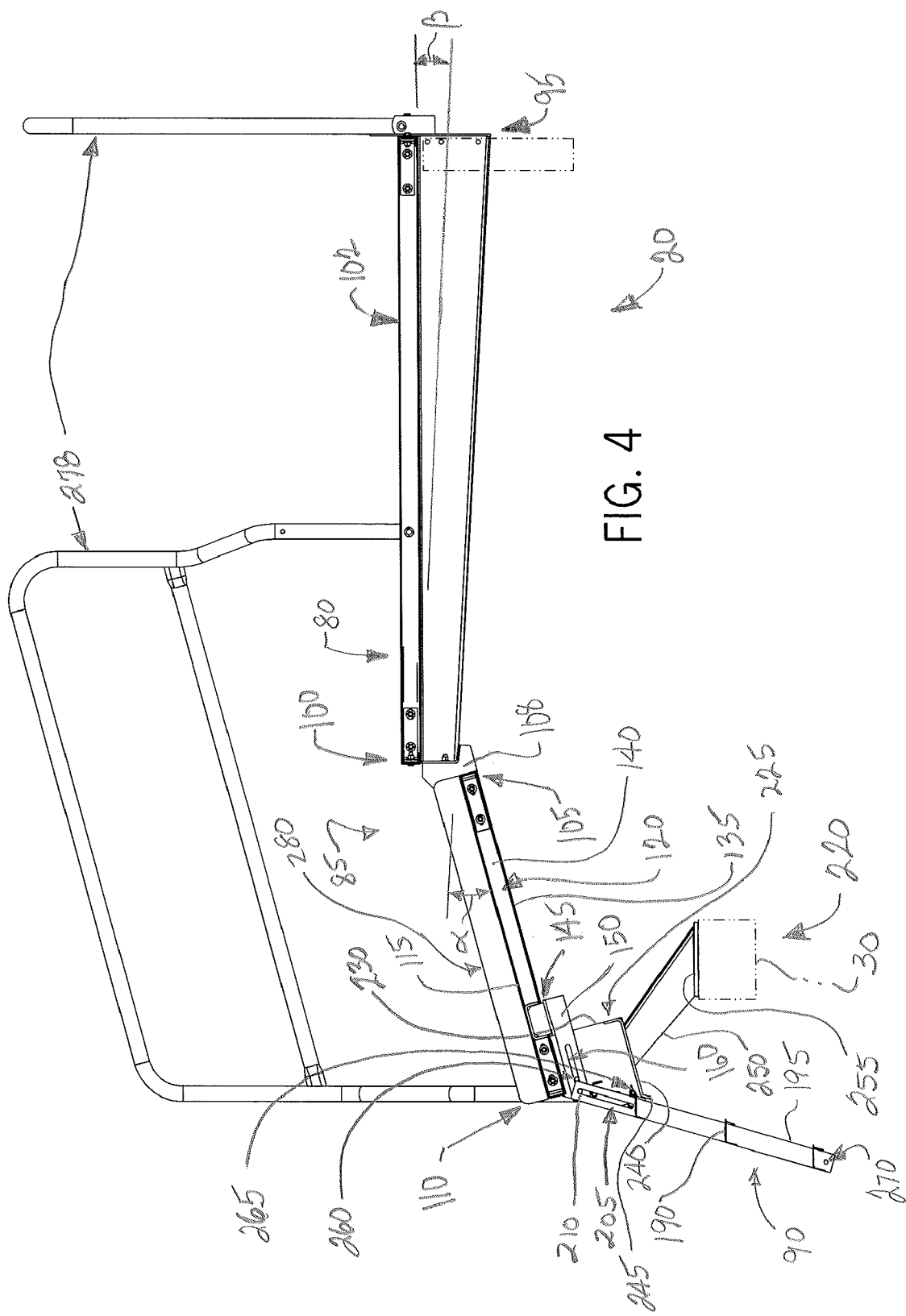
FIG. 4 illustrates a section view along line 4-4 in FIG. 3, illustrating a slide mechanism in support of the ladder assembly from an extended ramp of the access assembly.

Referring now to FIGS. 2-4, the central ramp 80 is fixedly mounted to the wheeled frame assembly 30 so as to move with the bulk storage tanks 35 and 40. As shown in FIG. 3, exemplary central ramp 80 includes a first end 95 generally inline with a forwardmost end of the first and second bulk storage tanks 35 and 40, and a rearward end 100 of the central ramp 80 that extends in a rearward direction beyond a rearwardmost end of the first and second bulk storage tanks 35 and 40 relative to a forward direction of travel 101 of the implement 25. As illustrated in FIG. 4, the exemplary central ramp 80 includes a central tread surface 102 generally aligned at a non-zero angle ($\beta$) above horizontal in the vertical direction. Alternatively, the alignment angle ($\beta$) of the tread surface 102 can be zero relative to horizontal.

Still referring to FIGS. 2-4, the exemplary extended ramp 85 includes a forward end 105 that is fixedly attached by a fixed mounting bracket 108 at the rearward end 100 of the central ramp 80. As illustrated in FIG. 4, an opposite rearward end 110 is located below the forward end 105 of the extended ramp 85 such that a length between the forward and rearward ends 105 and 110 of the extended ramp 85 is generally aligned at an angle ($\alpha$) downward from horizontal in the vertical direction. The extended ramp 85 comprises a tread surface 115 supported along its length by a pair of structural supports 120 and 125. The exemplary structural supports 120 and 125 are each generally L-shaped with a lower leg 135 spaced apart from the tread surface 115 by an intermediate vertical portion 140 along its length.

Figure 5:
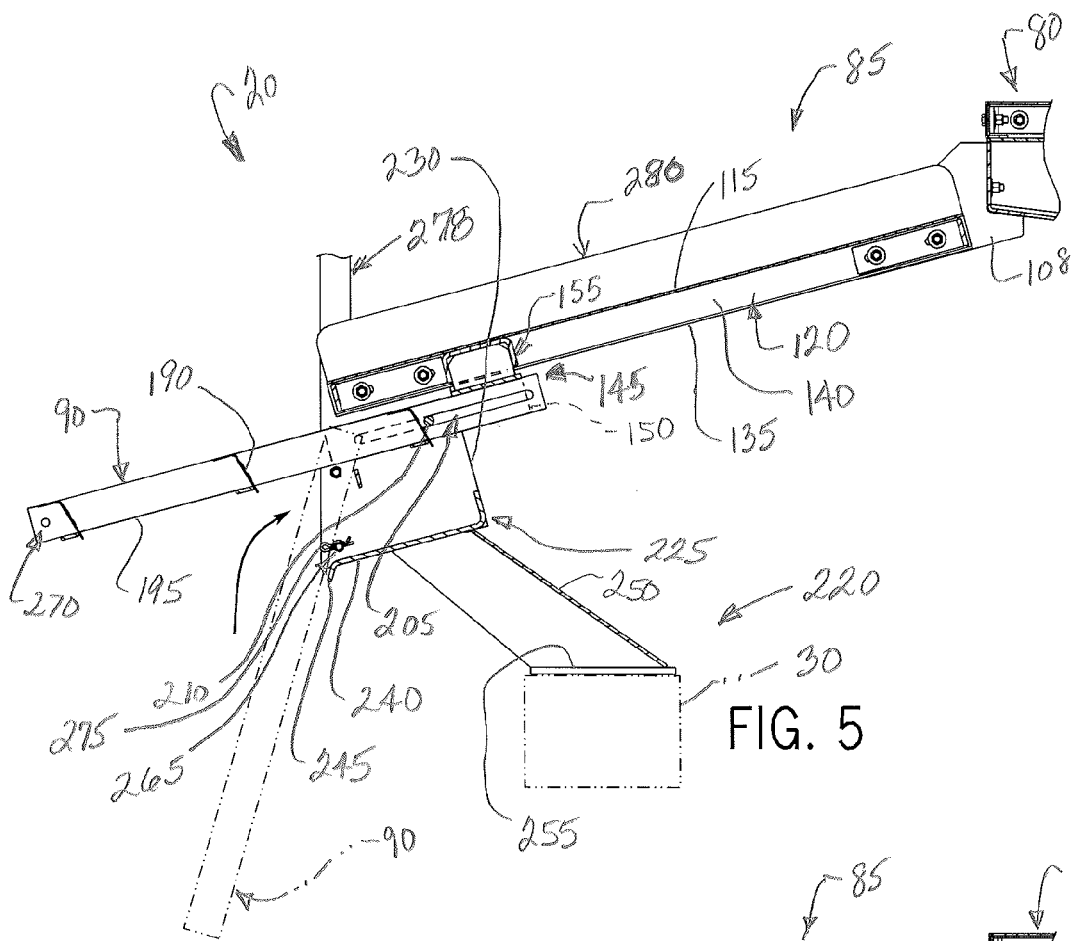
FIG. 5 illustrates a detailed section view of the access assembly, the pivotal ladder assembly shown between a lowered, extended position and a raised, extended position.
Figure 6:
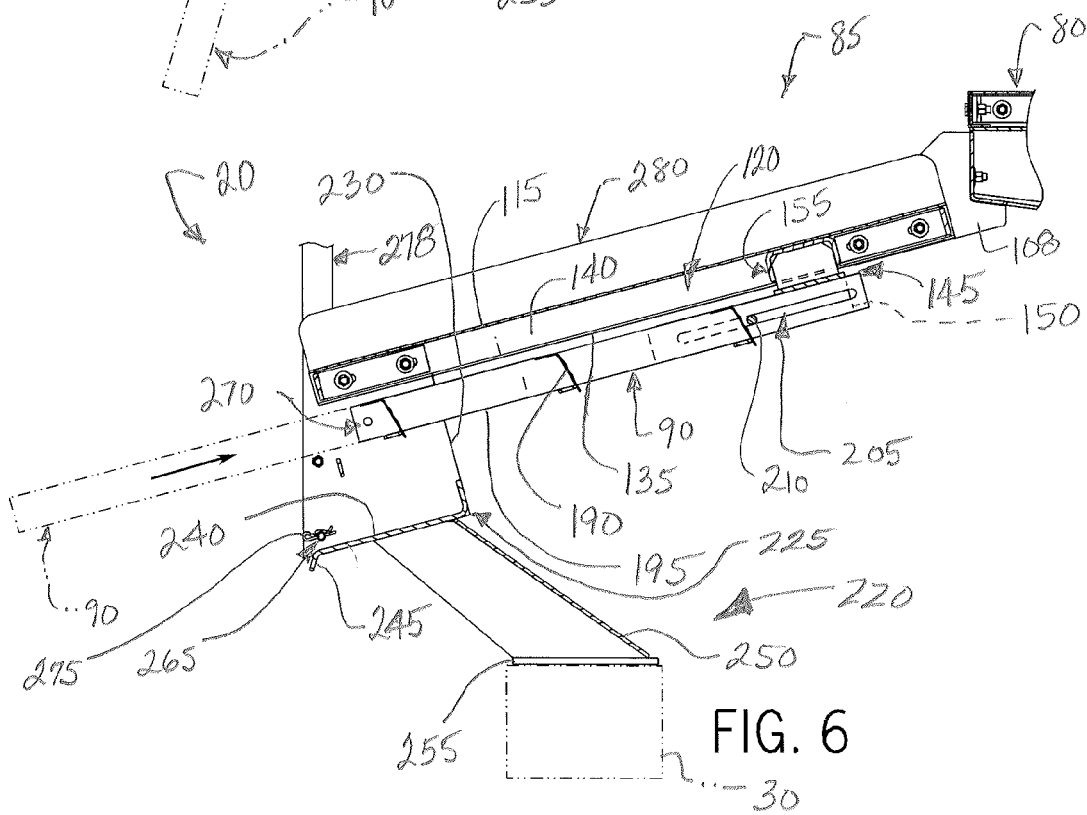
FIG. 6 illustrates a detailed section view of the access assembly, the pivotal ladder assembly shown between the raised, extended position and a raised, stowed position underneath the extended ramp.
Figure 7:
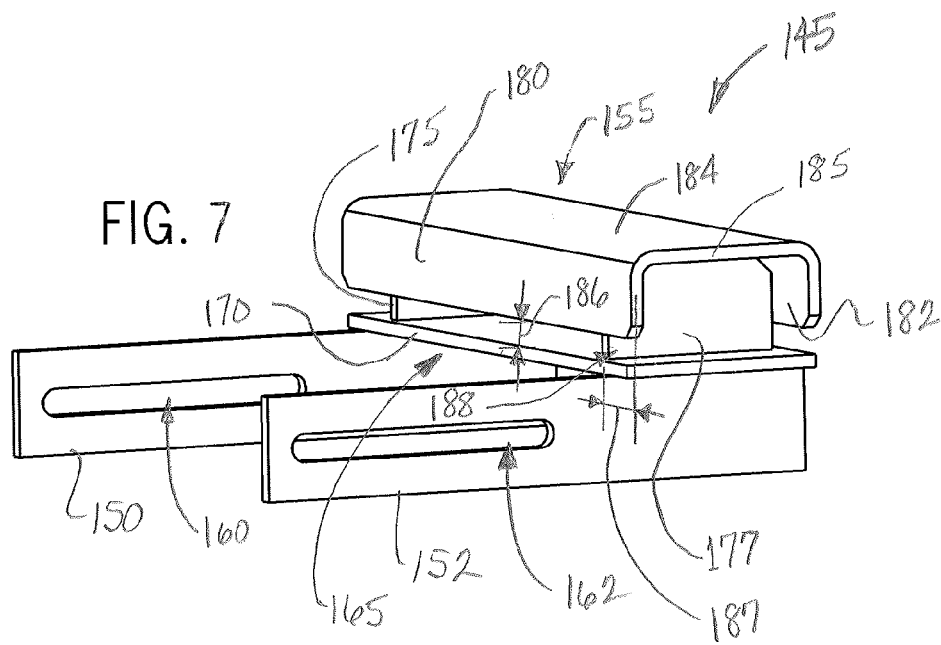
FIG. 7 illustrates a detailed isometric view of a slide mechanism of the access assembly shown in FIG. 4.

As illustrated in FIGS. 4-6, a slide mechanism 145 slidably and pivotally couples the ladder assembly 90 at the extended ramp 85. Referring specifically now to FIG. 7, the exemplary slide mechanism 145 includes a first guide bar 150 laterally spaced from and aligned generally parallel to a second guide bar 152, and a slide bar 155 extending transverse therebetween. The first guide bar 150 includes a first elongated opening 160, and the second guide bar 152 includes a second elongated opening 162 generally aligned with the elongated opening 160 with the first guide bar 150. Each elongated opening 160 and 162 has an extended length aligned in parallel with a length of the guide bars 150 and 152, respectively.

A slide mounting bracket 165 interconnects the slide bar 155 to the first and second guide bars 150 and 152. The slide mounting bracket 165 includes a generally horizontally aligned mounting plate 170 that extends between and is attached at an uppermost edge of both the first and second guide bars 150 and 152. A pair of spaced apart, vertical support struts 175 and 177 extend upwardly and in general perpendicular alignment from an upper planar surface of the mounting plate 170. The slide bar 155 is generally U-shaped and includes a first vertically-aligned leg 180 spaced apart from a second vertically-aligned leg 182 by a intermediate portion 184 extending in general perpendicular alignment therebetween. The uppermost edges of the vertical support struts 175 and 177 are received between the first and second vertical legs 180 and 182 and engage against the intermediate portion 184 of the slide bar 155. The lowermost edges of each vertical leg 180 and 182 of the U-shaped slide bar 155 are spaced a gap distance 186 apart from the upper surface of the mounting plate 170 in the vertical direction. The first and second vertical support struts 175 and 177 are each spaced at a laterally inward distance 187 from the laterally outwardmost edges of the slide bar 155 in the horizontal direction. Referring back to FIGS. 4-6, this above-described configuration of the lowermost edges of the first and second legs 180 and 182 of the U-shaped slide bar 155, the vertical support struts 175 and 177, and the upper surface of the mounting plate 170 define a slot 188 configured to receive at least a portion of the lower leg 135 of the structural supports 120 and 125 of the extended ramp 85 therein. Thereby, the slide mechanism 145 moves in sliding relation in the linear direction along the lower leg 135 of the structural supports 120 and 125 of the extended ramp 85.

Referring now to FIGS. 2 and 4-6, the ladder assembly 90 generally includes a series of conventional steps 190 extending between a pair of upwardly extendly side supports 195 and 200 in the vertical direction. An upper end of each side support 195 and 200 includes an elongated opening 205 extending in length generally parallel to a length of the side supports 195 and 200. As shown in FIGS. 4-6, pivot 210 extends through the elongated openings 205 of the side supports 195 and 200 of the ladder assembly 90, and the elongated openings 160 and 162 of the first and second guide bars 150 and 152, respectively, pivotally connecting the ladder assembly 90 about a horizontal axis, defined by the pivot 210, with respect to the slide mechanism 145.

Still referring to FIGS. 2 and 4-6, the access assembly 20 further includes a ramp support footing assembly 220 configured to support the rearward end 110 of the extended ramp 85 from the wheeled frame assembly 30 of the implement 25 (See FIG. 1). The exemplary ramp footing assembly 220 is fixed in relation to the extended ramp 85 and includes a mount bracket 225 having spaced apart vertical legs 230 and 232, a lateral portion 240 (See FIGS. 4-6) extending therebetween. The free ends of the legs 230 and 232 are fixedly attached at the L-shaped structural supports 120 and 125 of the extended ramp 85. As shown in FIGS. 4-6, a rearward edge 245 of the lateral portion 240 is angled downward in the vertical direction in relation to a remaining portion of the lateral portion 240, in general alignment to receive the steps 190 or side supports 195 and 200 of the ladder assembly 90 in the lowered, extended position.

A support strut 250 extends generally downward in the vertical direction from attachment at the lateral portion 240. A lower end of the support strut 250 is attached at a generally horizontal aligned footplate 255 located to engage the wheeled frame assembly 30. Referring specifically to FIG. 4, each vertical leg 230 and 232 of the U-shaped mounting bracket 225 includes an opening 260 configured to receive a lock pin 265 extending through an aligned opening 270 at the lower end of each of the side supports 195 and 200 of the ladder assembly 90. The lock pin 265 generally restrains the ladder assembly 90 in the raised, stowed position aligned vertically underneath the tread surface 115 of the extended ramp 85 (See FIG. 6). Referring specifically to FIGS. 5-6, coupling pins 275 are attached at the ends of the lock pin 265 to secure the lock pin 265 in-place. As shown in FIG. 5, the lock pin 265 is alternately stored at a second lower position, relative to opening 260 (See FIG. 4).

As illustrated in FIGS. 2 and 4, the access assembly 20 further includes a handrail assembly 278 and a kickplate 280 generally extending along all peripheral sides of the access assembly 20, except across the ladder assembly 90 for apparent reasons. The type and location of the handrail assembly 278 and the kickplate 280 can vary and is not limiting on the invention.

Figure 9:
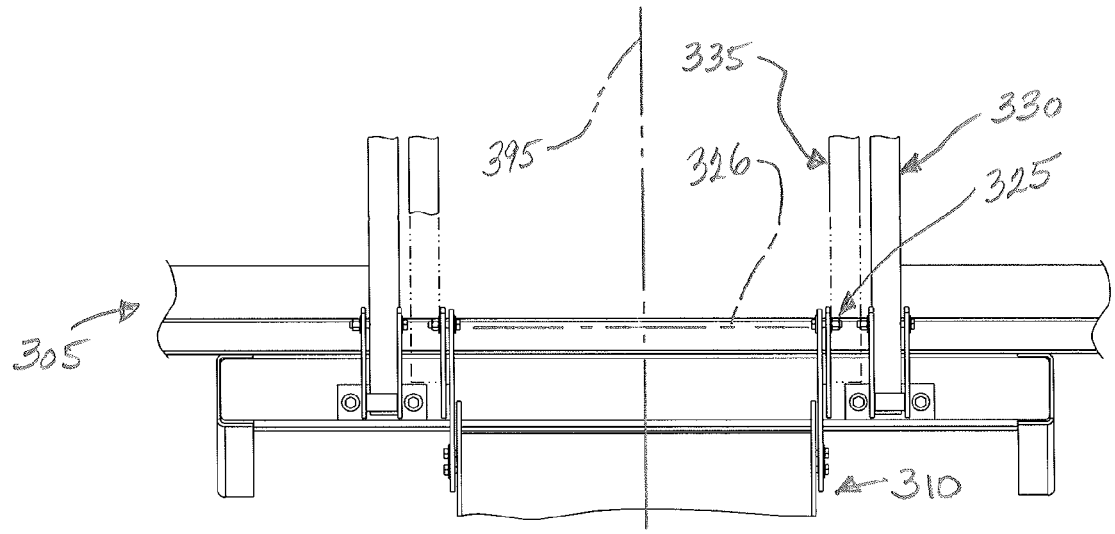
FIG. 9 illustrates a detailed rear elevation view of the pivotal extended ramp assembly of the access assembly shown in FIG. 8.
Figure 8:
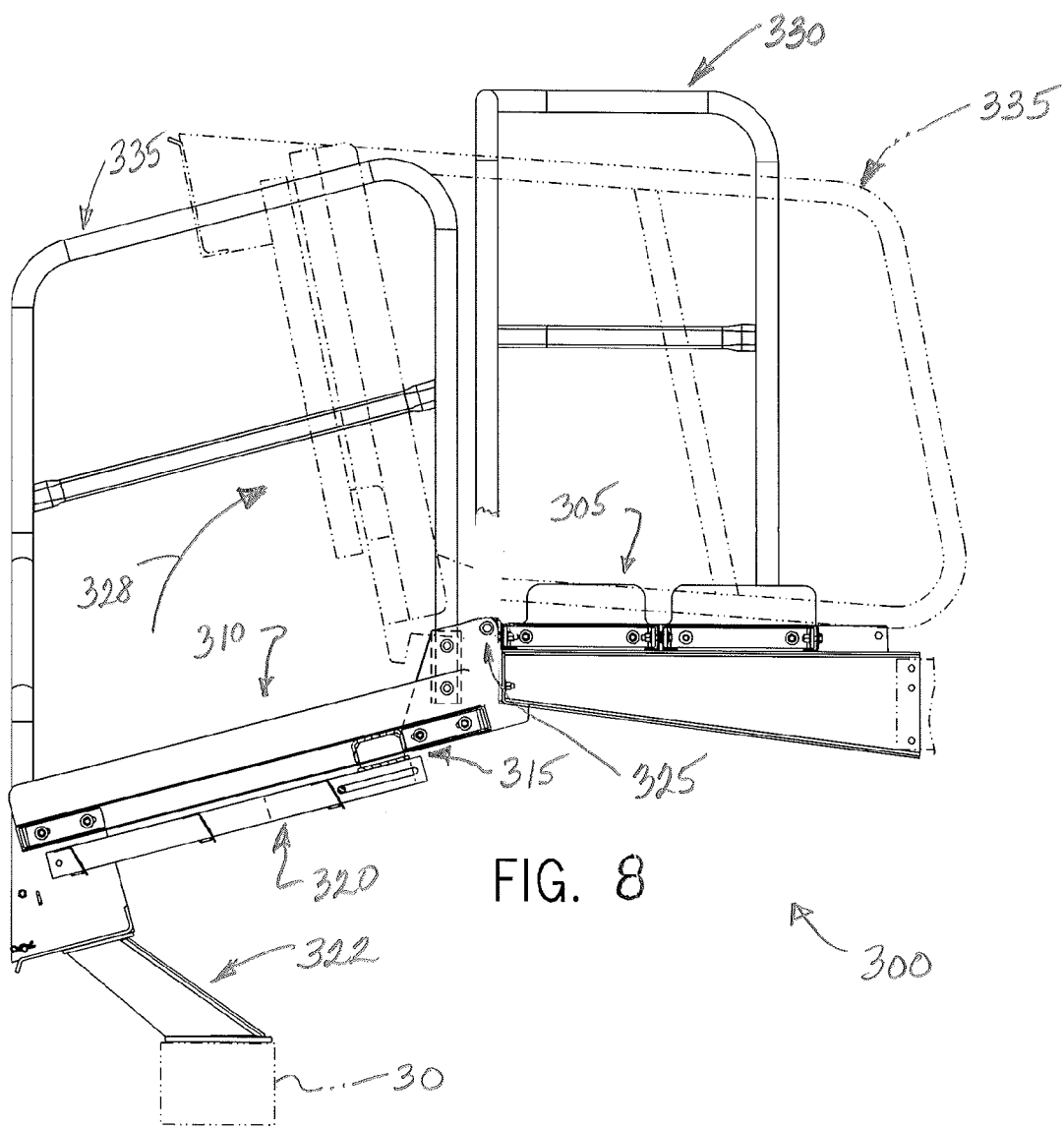
FIG. 8 illustrates a detailed side elevation view of another embodiment of an access assembly of the invention, including an extended ramp assembly pivotal between a lowered position and a raised, stowed position relative to a fixed central ramp.

FIGS. 8 and 9 illustrate another embodiment of an access assembly 300 in accordance with the present invention. As shown in FIG. 8, the access assembly 300 includes a central ramp 305, an extended ramp 310, a slide mechanism 315 in pivotal and sliding support of a ladder assembly 320 relative to the extended ramp 310, and a ramp support footing assembly 322, that is similar in construction to the central ramp 80, extended ramp 85, slide mechanism 145, ladder assembly 90, and ramp support footing assembly 220 of the access assembly 20 described above. The access assembly 300 further includes a pivot 325 that defines a horizontal axis 326 (See FIG. 9) about which both the extended ramp 310 and the ladder assembly 320 are pivotally supported at the rearward end 110 of the central ramp 305. The pivot 325 allows the extended ramp 310 and the ladder assembly 320 to be folded upward (illustrated by arrow and reference 328) in the vertical direction to a raised position (shown in phantom line) such that the extended ramp 310 and the ladder assembly 320 are located above the central ramp 305 in the vertical direction. A first handrail 330 is mounted on the central ramp 305, apart from a second handrail 335 mounted at the extended ramp 310. In relation to a central longitudinal axis 395 of the ladder assembly 320 and implement 25, the first handrail 330 is located laterally outward from the second handrail 335 of the extended ramp 310 so as to receive and accommodate the second handrail 335, the extended ramp 310, and the ladder assembly 320 therebetween in movement between the lowered position (See FIG. 8) and the raised, stowed position (shown in phantom line) in FIG. 8.

The access assembly 300 may further include miscellaneous lift assist mechanisms (not shown), e.g., springs, fluid-actuated cylinders, etc., configured to aid movement of the extended ramp 310 and/or the ladder assembly 320 between the lowered position and the raised, stowed position. Also, the access assembly 300 may further include an actuator handle (e.g., a rope or elongated rod, etc.) that allows an operator at the ground to readily pivot the extended ramp 310 and the ladder assembly 320 downward in the vertical direction relative to the central ramp 305 from the raised position. This embodiment of the access assembly 300 allows an operator located on a raised bed of a truck vehicle located at the rearward end of the central ramp 305, or an operator standing on the ground, to readily access the first and second storage tanks 35 and 40.

Having described the general construction by the access assemblies 20 and 300, the following is a general description of the operation of the access assembly 300 of the planting implement 25. Assume for example that the access assembly 300 is in the raised, stowed position (shown in phantom line in FIG. 8) such that the extended ramp 310 and ladder assembly 320 are pivoted upward in the vertical direction about the horizontal axis 326 (FIG. 9) defined by the pivot 325 relative to the central ramp 305. An operator located on a raised bed of a truck pulled alongside the rearward end 110 of the central ramp 305 of the implement 25 can pivot the extended ramp 310 and the ladder assembly 320 downward in the vertical direction relative to the central ramp 305 about the horizontal axis 326 defined by the pivot 325. With the extended ramp 310 in the lowered, extended position (See FIG. 8), the operator can access the central ramp 305 from the truckbed via the extended ramp 310 so as to access the first and/or second bulk storage tanks 35 and 40 (See FIG. 1).

Alternatively, an operator can use the access assemblies 20 and 300 to access the storage tanks 35 and 40 from the ground. The ladder assemblies 90 and 320 are similar in construction, and therefore operate in a similar manner. The following description is in reference to ladder assembly 90. However, it should be understood that ladder assembly 320 of the access assembly 300 operates in a similar manner.

Removal of the coupling pin 275 and the lock pin 265 allows the operator to independently slide the ladder assembly 320 in a generally linear and rearward direction in parallel relative to the extended ramp 85. In the fully extended position of the ladder assembly 320, the pivot pin 210 engages a rearwardmost end of openings 160 of the slide mechanism 145 and forward most end of the openings 205 in the side supports 195 and 200 such that the ladder assembly 90 is pivotal downward in the vertical direction toward the extended, lowered position (See FIG. 4). The operator can then climb the extended, lowered ladder assembly 90 and cross the extended ramp 85 and central ramp 80 to access the storage tanks 35 and 40 (See FIG. 1).

When dismounting from the planting implement 25, the operator steps from the central ramp 80 onto the extended ramp 85 and down the ladder assembly 90 to the ground. The ladder assembly 90 can then be pivoted upward in the vertical direction about the pivot 210 until in general parallel, linear alignment with the extended ramp 85. Once generally aligned with the extended ramp 85, the ladder assembly 90 can be slid in the forward, linear direction via the slide mechanism 145 to a stowed position in general parallel alignment with, and underneath in the vertical direction relative to, the extended ramp 85. The elongated opening 160 of the slide mechanism 145 and the elongated opening 160 of the ladder assembly 90 allows the ladder assembly 90 to initially slide forward independently of the slide mechanism 145. The side supports 195 and 200 slide underneath the mounting bracket 165, such that the mounting bracket 165 in combination with the pivot pin 210 restrains independent pivoting of the ladder assembly 90 in the downward direction relative to the extended ramp 85. The lock pin 265 inserts through the opening 260 in the vertical legs 230 and 232 of the foot support mounting bracket 225 and through the opening 270 at the lower end of the ladder assembly 90, thereby securing the ladder assembly 90 relative to the extended ramp 85. As illustrated in FIG. 8, the extended ramp 310 and ladder assembly 320 both lift about pivot 325 to the raised, stowed position (shown in phantom line) above the central ramp 305. In the raised, stowed position, the access assembly 300 reduces opportunities of interference with operation of the planting implement 25, especially over rough terrain. Neither access assembly 20 and 300 is directly connected at or includes the rearward hitch 53 so as to readily allow attachment of additional implements in tow by the planting implement 25.

While the invention has been shown and described with respect to particular embodiments, it is understood that alternatives and modifications are possible and are contemplated as being within the scope of the present invention.

Many changes and modifications could be made to the invention without departing from the spirit thereof. The scope of these changes will become apparent from the appended claims.

We claim:

1. An access assembly in combination with a planting implement having a first storage tank laterally adjacent to a second storage tank both mounted on a wheeled frame assembly for movement in a forward direction of travel, comprising:

a central ramp located between and fixed relative to the first and second storage tanks;

an extended ramp having a forward end opposite a rearward end aligned in a fore-and-aft direction relative to the direction of travel of the implement, the forward end of the extended ramp pivotally connected about a first horizontal axis at a rearward end of the central ramp; and a ladder defined by first and second side supports including upper ends, the first and second side supports having elongated slots therein adjacent the upper ends; a first and second pivots, the first pivot extending through the slot in a first guide bar of a slide mechanism and the slot in the first side support of the ladder and the second pivot extending through the slot in a second guide bar of the slide mechanism and the slot in the second side support of the ladder so as to pivotally couple the guide bars of the slide mechanism to the ladder about a second horizontal, said ladder pivotally coupled about the second horizontal axis at the rearward end of the extended ramp, wherein the ladder and the extended ramp pivot together about the first horizontal axis at the forward end of the extended ramp between a raised position and a lowered position.

2. The access assembly of claim 1, wherein the ladder is configured to slide in a linear direction in parallel relation to the extended ramp.

3. The access assembly of claim 2, wherein the ladder slides between an extended position and a stowed position, the ladder in the extended position pivotal about the rearward end of the extended ramp, the ladder in the stowed position is aligned underneath the extended ramp and restrained from pivoting independent of the extended ramp.

4. The access assembly of claim 3, further comprising a lock pin configured to restrain the ladder in the stowed position relative to the extended ramp.

5. The access assembly of claim 1, wherein the extended ramp includes a continuous tread surface, and wherein the ladder is guided to slide in the linear direction by a slide mechanism located underneath the tread surface.

6. The access assembly of claim 1, further comprising a first handrail located at one side of the extended ramp and generally aligned in the fore-and-aft direction and parallel to a second handrail located at an opposite side of the extended ramp.

7. The access assembly of claim 1, further comprising a ramp support footing assembly located at the rearward end of the extended ramp, the ramp support footing assembly aligned to support the rearward end of the extended ramp in a vertical direction from engagement at the wheeled frame assembly.

* * * * *